United States Patent
Pan et al.

(10) Patent No.: US 11,867,207 B2
(45) Date of Patent: Jan. 9, 2024

(54) ELECTRO-HYDRAULIC SERVO ACTUATOR CAPABLE OF IMPLEMENTING LONG-STROKE AND HIGH-FREQUENCY LOADING, AND CONTROL METHOD

(71) Applicant: TSINGHUA UNIVERSITY, Beijing (CN)

(72) Inventors: Peng Pan, Beijing (CN); Zhizhou He, Beijing (CN); Youming Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 8 days.

(21) Appl. No.: 17/691,146

(22) Filed: Mar. 10, 2022

(65) Prior Publication Data

US 2022/0196044 A1      Jun. 23, 2022

Related U.S. Application Data

(63) Continuation of application No. PCT/CN2019/113995, filed on Oct. 29, 2019.

(30) Foreign Application Priority Data

Sep. 12, 2019  (CN) .......................... 201910863903.5
Sep. 12, 2019  (CN) .......................... 201921531124.7

(51) Int. Cl.
*F15B 21/08* (2006.01)
*F15B 13/08* (2006.01)
*G01M 7/02* (2006.01)

(52) U.S. Cl.
CPC .......... *F15B 21/087* (2013.01); *F15B 13/085* (2013.01); *G01M 7/02* (2013.01);
(Continued)

(58) Field of Classification Search
CPC .................. F15B 13/085; F15B 21/087; F15B 2211/6656; G01M 7/02; G01M 7/022
See application file for complete search history.

(56) References Cited

U.S. PATENT DOCUMENTS 3,769,594 A * 10/1973 Wawra .................. H03K 5/082
                                                       327/91

FOREIGN PATENT DOCUMENTS

CN      101608965 A      12/2009
CN      101813552 A      8/2010
(Continued)

*Primary Examiner* — Thomas E Lazo

(57) ABSTRACT

The disclosure discloses an electro-hydraulic servo actuator capable of implementing long-stroke and high-frequency loading and a control method. The actuator includes: a long hydraulic cylinder with a piston, a short hydraulic cylinder with a piston, a fixed-end rod, low frequency and high frequency electro-hydraulic servo valves, a left rod chamber, a right rod chamber, a force applying end head, and a force applying end rod. With this structure, the displacement of the piston of the short hydraulic cylinder is a combination of small-displacement and high-frequency movement and large-displacement and low-frequency movement, so as to realize the generation of large-displacement and high-frequency movement. Therefore, a target large-displacement and high-frequency excitation is applied to the specimen under load test. The actuator can output high-frequency and large-displacement target excitation of 0.1 Hz to 200 Hz and 0 mm to 1500 mm, and has a simple mechanical structure, advanced control process, and good practicability.

12 Claims, 6 Drawing Sheets

(52) U.S. Cl.
CPC . *F15B 2211/526* (2013.01); *F15B 2211/6653* (2013.01); *F15B 2211/6656* (2013.01)

(56) References Cited

FOREIGN PATENT DOCUMENTS

| | | | | |
|---|---|---|---|---|
| CN | 102878960 | A | * | 1/2013 |
| CN | 102878960 | A | | 1/2013 |
| CN | 103603842 | A | | 2/2014 |
| CN | 204493355 | U | * | 7/2015 |
| CN | 105003495 | A | | 10/2015 |
| CN | 107575432 | A | * | 1/2018 |
| CN | 107575432 | A | | 1/2018 |
| JP | S6022640 | A | | 2/1985 |

* cited by examiner

ELECTRO-HYDRAULIC SERVO ACTUATOR CAPABLE OF IMPLEMENTING LONG-STROKE AND HIGH-FREQUENCY LOADING, AND CONTROL METHOD

CROSS-REFERENCES TO RELATED APPLICATIONS

The present application is a continuation of International Patent Application No. PCT/CN2019/113995, filed on Oct. 29, 2019, which claims priority to Chinese Patent Application No. 201910863903.5, titled "ELECTRO-HYDRAULIC SERVO ACTUATOR CAPABLE OF IMPLEMENTING LONG-STROKE AND HIGH-FREQUENCY LOADING, AND CONTROL METHOD", filed on Sep. 12, 2019 by TSINGHUA UNIVERSITY, and Chinese Patent Application No. 201921531124.7, titled "ELECTRO-HYDRAULIC SERVO ACTUATOR CAPABLE OF IMPLEMENTING LONG-STROKE AND HIGH-FREQUENCY LOADING", filed on Sep. 12, 2019 by TSINGHUA UNIVERSITY, the entire disclosures of which are incorporated here by their references.

FIELD

The present disclosure relates to the technical field of civil engineering structure test apparatuses, in particular to an electro-hydraulic servo actuator capable of implementing long-stroke and high-frequency loading and a control method.

BACKGROUND

With the development of China's economy and society and the improvement of the level of the construction industry, more and more large and complex structures have emerged, such as large-span domes and hydraulic dams. The designs of these structures are complex and subjected to influence from many factors, and lack routine design theory and method references, and since China is an earthquake-prone country, it is necessary to verify the safety of the structural designs through earthquake simulation shaking table test. This kind of structures has high complexity, requires high-frequency excitation to obtain its high-order modal response, and requires large-displacement excitation to obtain their dynamic response under near-fault or long-period earthquakes.

The shaking table applies loads by setting one or a group of actuators in a certain direction. Traditional structure test shaking table actuators are divided into two types, short-stroke actuators and long-stroke actuators. The short-stroke actuators can apply high-frequency excitation of 50 Hz or higher, but can hardly achieve large-displacement excitation; the long-stroke actuators can apply displacement excitation of ±250 mm or more, but can hardly achieve high-frequency excitation. Traditional actuators are restricted by power, control accuracy, and others factors, and can hardly generate large-displacement and high-frequency excitation. Therefore, it is difficult to realize the shaking table test for a large and complex structure at present.

SUMMARY

The present disclosure aims to solve at least one of the technical problems in the related art to a certain extent.

For this reason, one purpose of the present disclosure is to provide an electro-hydraulic servo actuator capable of implementing long-stroke and high-frequency loading, which effectively solves the problem that traditional actuators cannot generate an excitation with both a large displacement and a high frequency. The electro-hydraulic servo actuator has a simple mechanical structure, an advanced control process, and good practicability.

Another purpose of the present disclosure is to provide a control method of an electro-hydraulic servo actuator capable of implementing long-stroke and high-frequency loading.

In order to achieve the above purpose, embodiments of one aspect of the present disclosure propose an electro-hydraulic servo actuator capable of implementing long-stroke and high-frequency loading, including: a long hydraulic cylinder with a piston; a short hydraulic cylinder with a piston; a fixed-end rod having one end connected to the piston of the long hydraulic cylinder, and the other end fixed; a low frequency electro-hydraulic servo valve and a high frequency electro-hydraulic servo valve, the low frequency electro-hydraulic servo valve and the high frequency electro-hydraulic servo valve being configured to convert electrical signals into hydraulic pressure flow control signals to control hydraulic pressure changes in left and right chambers of the hydraulic cylinders to implement corresponding piston movements; a left rod chamber and a right rod chamber; and a force applying end head and a force applying end rod, wherein the force applying end rod is connected to the piston of the short hydraulic cylinder and the force applying end head to output a movement of the piston of the short hydraulic cylinder to the force applying end head, the force applying end head has one end connected to the force applying end rod through a hinge joint, and the other end connected to a specimen under a load test, thereby applying a target large-displacement and high-frequency excitation to the specimen under the load test.

The electro-hydraulic servo actuator capable of implementing long-stroke and high-frequency loading in the embodiments of the present disclosure breaks through the technical limitations of traditional actuators that cannot apply an excitation with both a large displacement and a high frequency, and can achieve low-power, high-efficiency, and accurate large-displacement and high-frequency target excitation generation and loading; the electro-hydraulic servo actuator has a simple structure, clear force transmission, and respective parts have reasonable force bearing statuses; the actuator adopts advanced control process and algorithm with high robustness to ensure that the target excitation can be output accurately and stably; the product has good practicability and high integration, and can be customized and produced based on application needs; further, the research and development and promotion of the actuator will greatly promote the development of earthquake simulation shaking table tests for large and complex structures, and provide a solid guarantee for the safe and reasonable design of such structures.

In addition, the electro-hydraulic servo actuator capable of implementing long-stroke and high-frequency loading according to the above embodiments of the present disclosure may also have the following additional technical features:

Further, in an embodiment of the present disclosure, the electro-hydraulic servo actuator further includes: a fixed hinge joint and a fixed end head, and the fixed hinge joint and the fixed end head are configured to fix the other end of the fixed-end rod to a ground or a reaction wall.

Further, in an embodiment of the present disclosure, the left rod chamber and the right rod chamber are connected to each other through a rigid joint.

Further, in an embodiment of the present disclosure, the rigid joint is an end plate bolt connection between the left rod chamber and the right rod chamber or a welding connection between the left rod chamber and the right rod chamber, in such a manner that the left rod chamber and the right rod chamber have no relative displacement in six degrees of freedom.

Further, in an embodiment of the present disclosure, a piston displacement of the short hydraulic cylinder includes a small-displacement and high-frequency movement of the piston of the short hydraulic cylinder relative to the short hydraulic cylinder under hydraulic pressure changes controlled by the high frequency electro-hydraulic servo valve, and a large-displacement and low-frequency movement generated by the short hydraulic cylinder itself along with the long hydraulic cylinder.

In order to achieve the above purpose, embodiments of another aspect of the present disclosure propose a control method of the electro-hydraulic servo actuator capable of implementing long-stroke and high frequency loading according to the above embodiments, including: obtaining a target acceleration signal, and obtaining a low-frequency acceleration signal and a high-frequency acceleration signal based on the target acceleration signal through a frequency division algorithm; inputting reference signals to a long-stroke and low-frequency controller and a short-stroke and high-frequency controller, respectively, depending on a control strategy and a control algorithm that are adopted; controlling the long-stroke and low-frequency controller to output a first driving signal to a long-stroke electro-hydraulic servo system, and controlling the short-stroke and high-frequency controller to output a second driving signal to a short-stroke electro-hydraulic servo system, in such a manner that the long-stroke electro-hydraulic servo system and the short-stroke electro-hydraulic servo system generate respective output forces based on respective driving signals and push a load to move, wherein the long-stroke electro-hydraulic servo system includes the long hydraulic cylinder with the piston and the low frequency electro-hydraulic servo valve, and the short-stroke electro-hydraulic servo system includes the short hydraulic cylinder with the piston and the high frequency electro-hydraulic servo valve; and detecting a plurality of motion signals of pistons of the electro-hydraulic servo actuator relative to respective hydraulic cylinders of the electro-hydraulic servo actuator, and inputting, depending on a feedback strategy that is adopted, the motion signals as feedback signals to the controllers of the two electro-hydraulic servo systems, to further correct the driving signals of the electro-hydraulic servo systems.

The control method of the electro-hydraulic servo actuator capable of implementing long-stroke and high-frequency loading in the embodiments of the present disclosure breaks through the technical limitations of traditional actuators that cannot apply an excitation with both a large displacement and a high frequency, and can achieve low-power, high-efficiency, and accurate large-displacement and high-frequency target excitation generation and loading; the electro-hydraulic servo actuator has a simple structure, clear force transmission, and respective parts have reasonable force bearing statuses; the actuator adopts advanced control process and algorithm with high robustness to ensure that the target excitation can be output accurately and stably; the product has good practicability and high integration, and can be customized based on application needs; further, the research and development and promotion of the actuator will greatly promote the development of earthquake simulation shaking table tests for large and complex structures, and provide a solid guarantee for the safe and reasonable design of such structures.

In addition, the control method of the electro-hydraulic servo actuator capable of implementing long-stroke and high frequency loading according to the above embodiments of the present disclosure may also have the following additional technical features:

Further, in an embodiment of the present disclosure, the frequency division algorithm includes: transforming the target acceleration signal a from a time domain to a frequency domain through fast Fourier transform; cutting the obtained frequency domain signal into two sections at a predetermined frequency to obtain a high-frequency frequency domain signal and a low-frequency frequency domain signal; transforming the obtained two frequency domain signals back to the time domain through inverse fast Fourier transform to obtain a low-frequency time domain signal $a_1$ and a high-frequency time domain signal $a_2$; and adding the two time domain signals $a_1$ and $a_2$ together to obtain the original target acceleration signal a to verify a correctness of signal separation.

Further, in an embodiment of the present disclosure, the control algorithm is a three-parameter control algorithm, a PID control algorithm, an iterative control algorithm, an adaptive control algorithm, a robust control algorithm, an optimal control algorithm, or an acceleration trajectory tracking control algorithm, etc.

Further, in an embodiment of the present disclosure, the control strategy is: a control strategy of tracking, by the piston of the long hydraulic cylinder, the low-frequency acceleration signal, and simultaneously tracking, by the piston of the short hydraulic cylinder, the target acceleration signal, wherein a reference signal for the long-stroke and low-frequency controller is the low-frequency acceleration signal, and a reference signal for the short-stroke and high-frequency controller is the target acceleration signal; or a control strategy of tracking, by the piston of the long hydraulic cylinder, the low-frequency acceleration signal, and simultaneously tracking, by the piston of the short hydraulic cylinder, the high-frequency acceleration signal relative to the piston of the long hydraulic cylinder, wherein the reference signal for the long-stroke and low-frequency controller is the low-frequency acceleration signal, and the reference signal for the short-stroke and high-frequency controller is the high-frequency acceleration signal.

Further, in an embodiment of the present disclosure, the feedback strategy is a feedback strategy of inputting a motion signal of the piston of the long hydraulic cylinder to the short-stroke and high-frequency controller, a feedback signal of the short-stroke and high-frequency controller being an absolute motion signal of the force applying end head, that is, a sum of relative motion signals of the two pistons; or a feedback strategy of inputting motion signals of respective pistons to respective controllers, and using the relative motion signals of the pistons as feedback signals of the respective controllers.

Further, in an embodiment of the present disclosure, an output force generated by the long-stroke electro-hydraulic servo system pushes the piston of the long hydraulic cylinder, the piston of the short hydraulic cylinder, and the force applying end head to move, an output force generated by the short-stroke electro-hydraulic servo system pushes the force applying end head to move, and at the same time, a reaction force is generated and applied to the long-stroke electro-hydraulic servo system.

The additional aspects and advantages of the present disclosure will be partly given in the following description, and part of them will become apparent from the following description, or be understood through the practice of the present disclosure.

BRIEF DESCRIPTION OF DRAWINGS

The above and/or additional aspects and advantages of the present disclosure will become apparent and easy to understand from the following description of the embodiments in conjunction with the accompanying drawings, in which.

DESCRIPTION OF REFERENCE SIGNS

Figure 1:
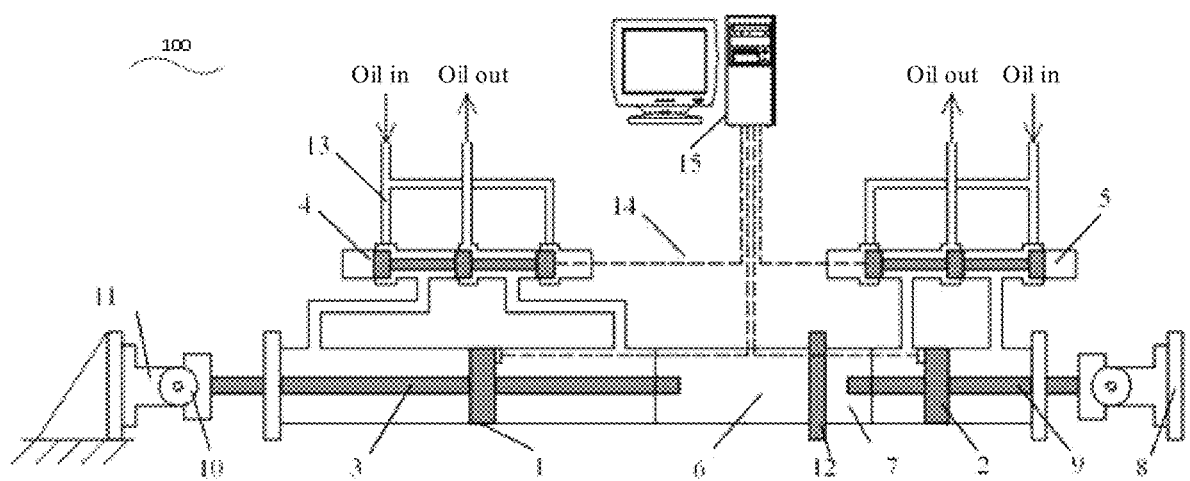
FIG. 1 is a structural schematic diagram of an electro-hydraulic servo actuator capable of implementing long-stroke and high-frequency loading according to an embodiment of the present disclosure.

Key components such as electro-hydraulic servo actuator 100 capable of implementing long-stroke and high-frequency loading, long hydraulic cylinder 1, short hydraulic cylinder 2, fixed-end rod 3, low frequency electro-hydraulic servo valve 4, high frequency electro-hydraulic servo valve 5, left rod chamber 6, right rod chamber 7, force applying end head 8, force applying end rod 9, fixed hinge joint 10, fixed end head 11, and rigid joint 12, as well as oil pipe 13, transmission cable 14, and control terminal 15.

DESCRIPTION OF EMBODIMENTS

The embodiments of the present disclosure are described in detail below. Examples of the embodiments are shown in the accompanying drawings, throughout which the same or similar reference signs indicate the same or similar elements or elements with the same or similar functions. The embodiments described below with reference to the accompanying drawings are exemplary, and are intended to explain the present disclosure, but should not be construed as limiting the present disclosure.

The electro-hydraulic servo actuator capable of implementing long-stroke and high-frequency loading and the control method according to the embodiments of the present disclosure will be described below with reference to the drawings. First, the electro-hydraulic servo actuator capable of implementing long-stroke and high-frequency loading according to the embodiments of the present disclosure will be described with reference to the accompanying drawings.

FIG. 1 is a structural schematic diagram of an electro-hydraulic servo actuator capable of implementing long-stroke and high-frequency loading according to an embodiment of the present disclosure.

As shown in FIG. 1, the electro-hydraulic servo actuator 100 capable of implementing long-stroke and high-frequency loading includes: a long hydraulic cylinder 1 with a piston, a short hydraulic cylinder 2 with a piston, a fixed-end rod 3, a low frequency electro-hydraulic servo valve 4, a high frequency electro-hydraulic servo valve 5, a left rod chamber 6, a right rod chamber 7, a force applying end head 8, and a force applying end rod 9.

The fixed-end rod 3 has one end connected to the piston of the long hydraulic cylinder 1, and the other end of the fixed-end rod 3 is fixed; the low frequency electro-hydraulic servo valve 4 and the high frequency electro-hydraulic servo valve 5 are configured to convert electrical signals into hydraulic pressure flow control signals to control hydraulic pressure changes in left and right chambers of the hydraulic cylinders to implement corresponding piston movement; the force applying end rod 9 is connected to the piston of the short hydraulic cylinder 2 and the force applying end head 8 to output a movement of the piston of the short hydraulic cylinder 2 to the force applying end head 8, and the force applying end head 8 has one end connected to the force applying end rod 9 through a hinge joint, and the other end connected to a specimen under a load test, thereby applying a target large-displacement and high-frequency excitation to the specimen under the load test. The actuator 100 of the embodiment of the present disclosure effectively solves the problem that the traditional actuators cannot generate large-displacement and high-frequency excitation. The actuator 100 has simple mechanical structure, advanced control process, and good practicability.

It is understandable that the actuator 100 of the embodiment of the present disclosure is composed of a long-stroke and low-frequency electro-hydraulic servo system and a short-stroke and high-frequency electro-hydraulic servo system, which can be specifically used in a structure test shaking table, and realize the long-stroke and high-frequency loading of the structure test shaking table. As shown in FIG. 1, the actuator 100 specifically includes: key components such as the long hydraulic cylinder 1, the short hydraulic cylinder 2, the fixed-end rod 3, the low frequency electro-hydraulic servo valve 4, the high frequency electro-hydraulic servo valve 5, the left rod chamber 6, the right rod chamber 7, the force applying end head 8, the force applying end rod 9, a fixed hinge joint 10, a fixed end head 11, and a rigid joint 12, as well as supporting facilities such as oil pipe 13, transmission cable 14 and control terminal 15.

Specifically, for the long hydraulic cylinder 1, the fixed-end rod 3 connected by the piston is fixed to a ground or a reaction wall through the hinge joint 10, and thus will have no absolute displacement under the action of hydraulic pressure. The hydraulic pressure reaction force acts on the cylinder wall, causing translation motion of the long hydraulic cylinder relative to the piston. Therefore, the long hydraulic cylinder will have an absolute displacement relative to the ground or the reaction wall, and drive the low frequency electro-hydraulic servo valve 4, the oil pipe 13, and other components to move together.

The piston displacement of the short hydraulic cylinder 2 consists of two aspects: in one aspect, under the hydraulic pressure change controlled by the high frequency electro-hydraulic servo valve 5, the piston has a small-displacement and high-frequency movement relative to the short hydraulic cylinder; and in the other aspect, the short hydraulic cylinder itself generates a large-displacement and low-frequency movement along with the long hydraulic cylinder. Therefore, the displacement of the piston of the short hydraulic cylinder is a combination of small-displacement and high-frequency movement and large-displacement and low-frequency movement, so as to realize the generation of large-displacement and high-frequency movement.

The fixed-end rod 3 is located between the fixed hinge joint 10 and the piston of the long hydraulic cylinder, and is configured to output the movement of the long-stroke piston under the hydraulic pressure change. Specifically, the fixed-end rod 3 has one end connected to the piston of the long hydraulic cylinder, and the other end fixed to the ground or the reaction wall through the fixed hinge joint 10 and the fixed end head.

The low frequency electro-hydraulic servo valve 4 and the high frequency electro-hydraulic servo valve 5 can convert an electrical signal into a hydraulic pressure flow control signal to control hydraulic pressure changes in left and right chambers of the hydraulic cylinders to implement corresponding piston movements. Specifically, the low frequency electro-hydraulic servo valve 4 can convert an electrical signal into a hydraulic pressure flow control signal to control a hydraulic pressure change in left and right chambers of the long hydraulic cylinder to implement a long-stroke and low-frequency piston movement; and the high frequency electro-hydraulic servo valve 5 can convert an electrical signal into a hydraulic pressure flow control signal to control a hydraulic pressure change in left and right chambers of the short hydraulic cylinder to implement a short-stroke and high-frequency piston movement.

A rod chamber is provided at an end of each of the long hydraulic cylinder and the short hydraulic cylinder to ensure that the rod has enough displacement space. The two rod chambers are connected by the rigid joint 12. Specifically, the rod chambers include the left rod chamber 6 and the right rod chamber 7, the left rod chamber 6 is arranged at an end of the long hydraulic cylinder, and the right rod chamber 7 is arranged at an end of the short hydraulic cylinder. In an embodiment of the present disclosure, the left rod chamber 6 and the right rod chamber 7 are connected to each other through the rigid joint. The length of each rod chamber should not be less than a maximum stroke of the corresponding hydraulic cylinder.

The force applying end head 8 has one end connected to the force applying end rod 9 through a hinge joint, and the other end connected to the specimen under the load test, thereby applying the target large-displacement and high-frequency excitation to the specimen under the load test. The force applying end rod 9 is located between the hinge joint 10 and the piston of the short hydraulic cylinder, and is configured to output the movement of the short stroke piston under the hydraulic pressure change to the force applying end head 8.

Further, in an embodiment of the present disclosure, the actuator 100 of the embodiment of the present disclosure further includes: a fixed hinge joint 10 and a fixed end head 11. The fixed hinge joint 10 and the fixed end head 11 are configured to fix the other end of the fixed-end rod 3 to the ground or the reaction wall.

Specifically, the fixed hinge joint 10 has one end located on the fixed end head 11 of the actuator 100 and vertically penetrating through the fixed end head 11 through a rigid rod, and the other end connected to the other end of the fixed-end rod 3 so as to connect the fixed end head 11 and the fixed-end rod 3 in such a manner that the fixed end head 11 and the fixed-end rod 3 are rotatable within a certain range to achieve hinged effects. The fixed end head 11 is located on one side of the actuator and is usually composed of two convex steel blocks. The fixed end head 11 has one end fixed to the ground or the reaction wall by means of bolts, etc., for fixing the actuator and transmitting the reaction force to the ground.

Further, in an embodiment of the present disclosure, the rigid joint 12 is an end plate bolt connection between the rod chambers or a welding connection between the rod chambers, so that the left rod chamber 6 and the right rod chamber 7 have no relative displacement in six degrees of freedom.

Specifically, the rigid joint 12 can be a structure such as an end plate bolt connection between the rod chambers, a welding connection between the rod chambers, etc., the purpose of which is to integrate the long hydraulic cylinder and the short hydraulic cylinder into a whole, so as to ensure that the left and right rod chambers have no relative displacement in six degrees of freedom.

In summary, the actuator 100 of the embodiments of the present disclosure has the following advantages:

1) The actuator 100 has a simple structure and clear force transmission. The main structure of the actuator can be regarded as a combination of a long-stroke and low-frequency electro-hydraulic servo system and a short-stroke and high-frequency electro-hydraulic servo system. Respective parts have reasonable force bearing statuses due to the reasonable mechanical structures thereof, and can work synergistically to implement the combination of displacement and loading to output target excitation.

2) The product has good practicability and high integration. The actuator can be customized for frequency and stroke based on actual application needs, and can be applied in earthquake simulation shaking tables in different scenarios. The product is highly integrated and can be used after simple assembling and debugging.

According to the embodiment of the present disclosure, the electro-hydraulic servo actuator capable of implementing long-stroke and high-frequency loading breaks through the technical limitations of traditional actuators which cannot apply excitation having both a large displacement and a high frequency, and can generate and load low-power, high-efficiency, and accurate large-displacement and high-frequency target excitation; the electro-hydraulic servo actuator has a simple structure, clear force transmission, and respective parts have reasonable force bearing statuses; the actuator adopts advanced control process and algorithm and has high robustness, which ensures that the target excitation can be output accurately and stably; the product has good practicability and high integration, and can be customized and produced based on application needs; further, the research and development and promotion of the actuator will greatly promote the development of earthquake simulation shaking table tests for large and complex structures, and provide a solid guarantee for the safe and reasonable design of such structures.

Next, the control method of the electro-hydraulic servo actuator capable of implementing long-stroke and high-frequency loading according to the embodiments of the present invention will be described with reference to the accompanying drawings.

Figure 2:
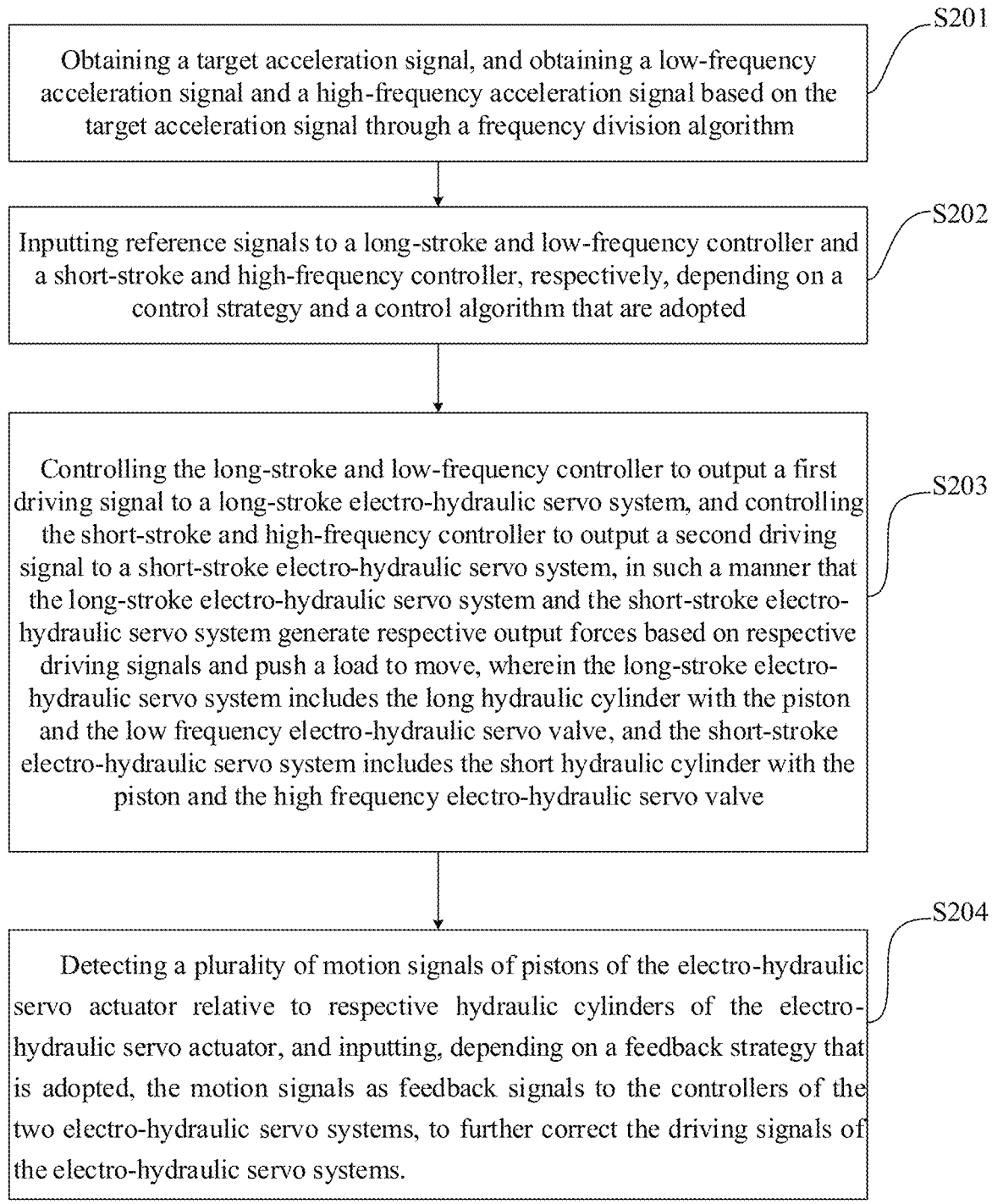
FIG. 2 is a flowchart of a control method of an electro-hydraulic servo actuator capable of implementing long-stroke and high frequency loading according to an embodiment of the present disclosure.

FIG. 2 is a flowchart of a control method of an electro-hydraulic servo actuator capable of implementing long-stroke and high-frequency loading according to an embodiment of the present disclosure.

As shown in FIG. 2, the control method of the electro-hydraulic servo actuator capable of implementing long-stroke and high-frequency loading adopts the electro-hydraulic servo actuator according to the above embodiments. The method includes the following steps:

In step S201, a target acceleration signal is obtained, and a low-frequency acceleration signal and a high-frequency acceleration signal are obtained based on the target acceleration signal through a frequency division algorithm.

It is understandable that the target acceleration signal a that is expected to be reproduced by the shaking table is input, and the signal a is separated in frequency domain to obtain a low-frequency acceleration signal $a_1$ and a high-frequency acceleration signal $a_2$.

Figure 3:
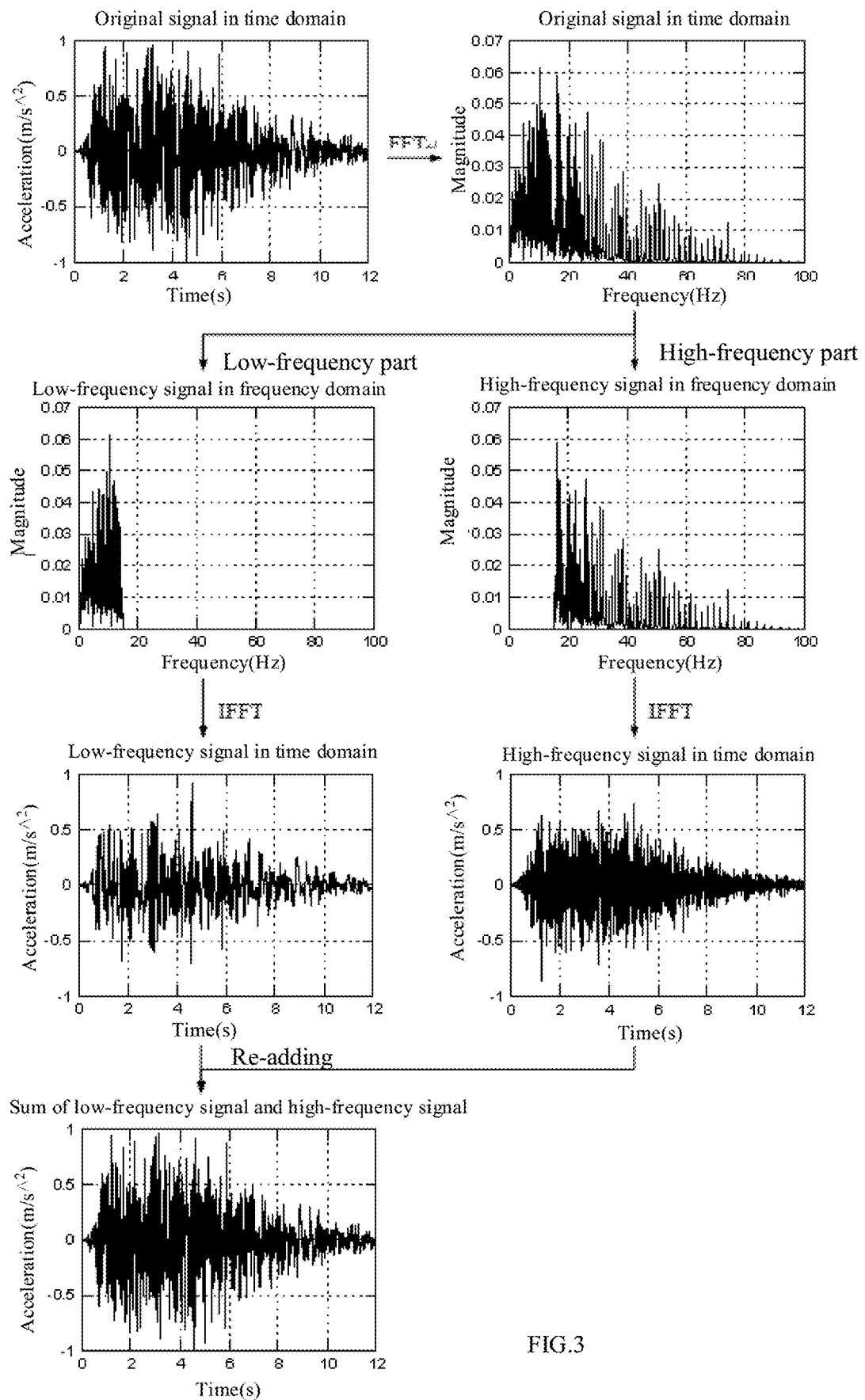
FIG. 3 is a schematic diagram of a method for separating high frequency and low frequency according to an embodiment of the present disclosure.

Specifically, a specific process of separating the target acceleration signal in frequency domain to obtain the high-frequency signal and the low-frequency signal is shown in FIG. 3. The steps of the frequency division algorithm include:

(1) transforming the target acceleration signal a from a time domain to a frequency domain through fast Fourier transform (FFT).

(2) cutting the obtained frequency domain signal into two sections at a predetermined frequency to obtain a high-frequency frequency domain signal and a low-frequency frequency domain signal;

(3) transforming the obtained two frequency domain signals back to the time domain through inverse fast Fourier transform (IFFT) to obtain a low-frequency time domain signal $a_1$ and a high-frequency time domain signal $a_2$; and (4) re-adding the two time domain signals $a_1$ and $a_2$ together to obtain the original target acceleration signal a to verify a correctness of signal separation.

In step S202, depending on a control strategy and a control algorithm that are adopted, reference signals are input to a long-stroke and low-frequency controller and a short-stroke and high-frequency controller, respectively.

In an embodiment of the present disclosure, the control strategy is: a control strategy in which the piston of the long hydraulic cylinder tracks the low-frequency acceleration signal, and simultaneously the piston of the short hydraulic cylinder tracks a full frequency original signal, i.e., the target acceleration signal, wherein a reference signal for the long-stroke and low-frequency controller is the low-frequency acceleration signal, and a reference signal for the short-stroke and high-frequency controller is the target acceleration signal; or a control strategy in which the piston of the long hydraulic cylinder tracks the low-frequency acceleration signal, and simultaneously the piston of the short hydraulic cylinder tracks the high-frequency acceleration signal relative to the piston of the long hydraulic cylinder, wherein the reference signal for the long-stroke and low-frequency controller is the low-frequency acceleration signal, and the reference signal for the short-stroke and high-frequency controller is the high-frequency acceleration signal.

Figure 4:
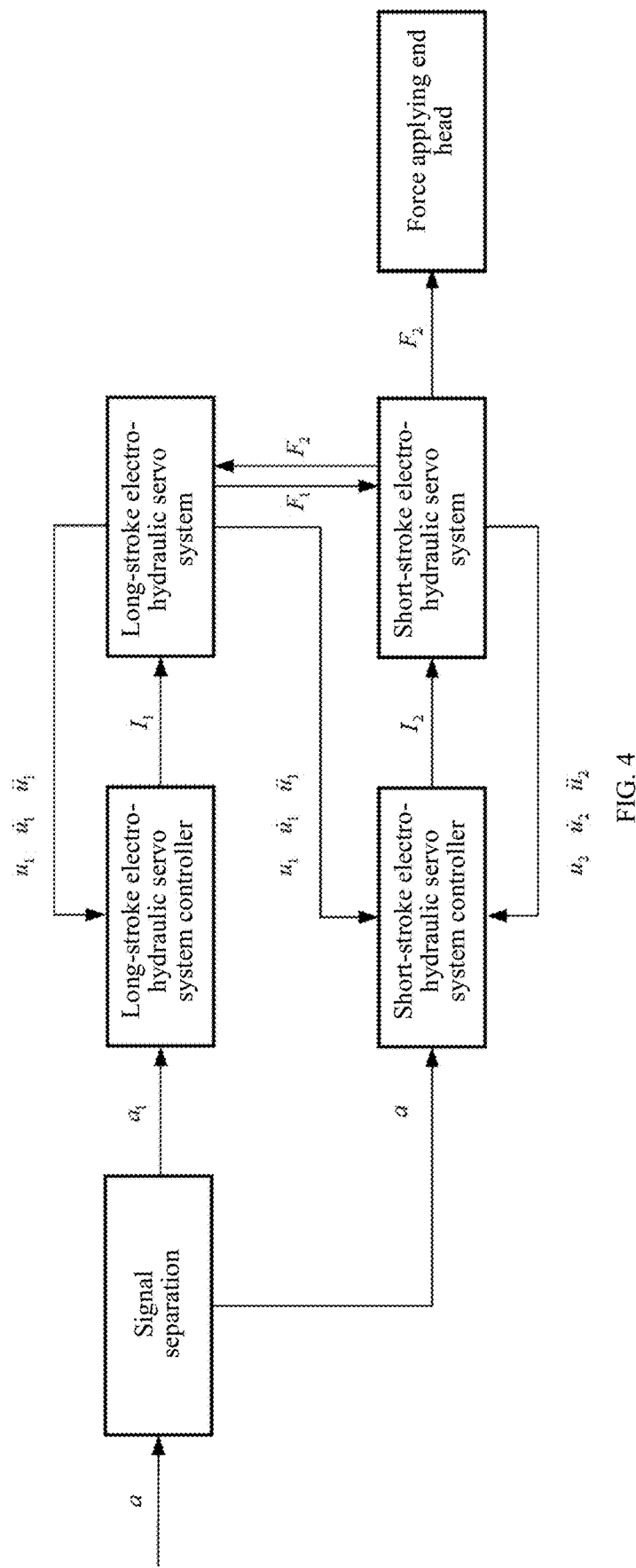
FIG. 4 is a schematic diagram of a control strategy 1 according to an embodiment of the present disclosure.
Figure 5:
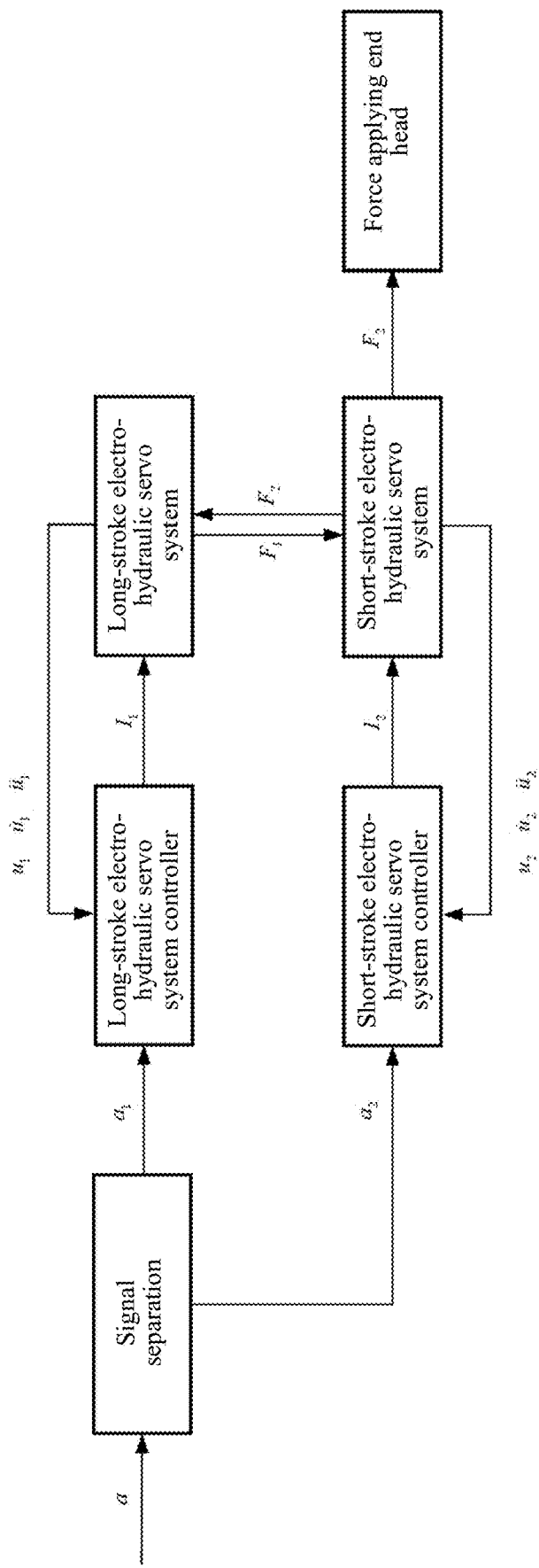
FIG. 5 is a schematic diagram of a control strategy 2 according to an embodiment of the present disclosure.

Specifically, on the basis of signal separation, depending on the control strategy, the reference signals are input to the long-stroke and low-frequency controller and the short-stroke and high-frequency actuator, respectively. There are two control strategies for selection. Control strategy 1 is shown in FIG. 4, and control strategy 2 is shown in FIG. 5. Specifically, the control strategy 1 includes that the piston of the long hydraulic cylinder tracks the low-frequency acceleration signal, and simultaneously the piston of the short hydraulic cylinder tracks the full frequency original signal, i.e., the target acceleration signal; and the control strategy 2 includes that the piston of the long hydraulic cylinder tracks the low-frequency acceleration signal, and simultaneously the piston of the short hydraulic cylinder tracks the high-frequency acceleration signal relative to the piston of the long hydraulic cylinder. When the control strategy 1 is adopted, the reference signal for the long-stroke and low-frequency controller is the low-frequency acceleration signal $a_1$, and the reference signal for the short-stroke and high-frequency controller is the target acceleration signal a; when the control strategy 2 is adopted, the reference signal for the long-stroke and low-frequency controller is the low-frequency acceleration signal $a_1$, and the reference signal for the short-stroke and high-frequency controller is the high-frequency acceleration signal $a_2$.

Optionally, in an embodiment of the present disclosure, the control algorithms may include a three-parameter control algorithm, a PID control algorithm, an iterative control algorithm, an adaptive control algorithm, a robust control algorithm, an optimal control algorithm, and an acceleration trajectory tracking control algorithm, etc.

It is understandable that, based on the actuator control process of the high and low-frequency separation method, the control algorithm of the electro-hydraulic servo system controller may be a three-parameter control algorithm, or a PID control algorithm, an iterative control algorithm, an adaptive control algorithm, a robust control algorithm, an optimal control algorithm, or an acceleration trajectory tracking control algorithm, etc.

In step S203, the long-stroke and low-frequency controller is controlled to output a first driving signal to a long-stroke electro-hydraulic servo system, and the short-stroke and high-frequency controller is controlled to output a second driving signal to a short-stroke electro-hydraulic servo system, so that the long-stroke electro-hydraulic servo system and the short-stroke electro-hydraulic servo system generate respective output forces based on respective driving signals and push a load to move. The long-stroke electro-hydraulic servo system includes the long hydraulic cylinder with the piston and the low frequency electro-hydraulic servo valve, and the short-stroke electro-hydraulic servo system includes the short hydraulic cylinder with the piston and the high frequency electro-hydraulic servo valve It is understandable that the two electro-hydraulic servo system controllers are calculated by algorithms, the long-stroke controller outputs a driving signal $I_1$ to the long-stroke electro-hydraulic servo system, and the short-stroke controller outputs a driving signal $I_2$ to the short-stroke electro-hydraulic servo system.

Further, in an embodiment of the present disclosure, the output force generated by the long-stroke electro-hydraulic servo system pushes the piston of the long hydraulic cylinder, the piston of the short hydraulic cylinder, and the force applying end head to move, the output force generated by the short-stroke electro-hydraulic servo system pushes the force applying end head to move, and at the same time, a reaction force is generated and applied to the long-stroke electro-hydraulic servo system.

It is understandable that the two electro-hydraulic servo systems generate respective output forces based on respective driving signals and push the load to move. The output force generated by the long-stroke electro-hydraulic servo system pushes the piston of the long hydraulic cylinder, the piston of the short hydraulic cylinder, and the force applying end head to move together, the output force generated by the short-stroke electro-hydraulic servo system pushes the force applying end head to move, and at the same time, a reaction force is generated and applied to the long-stroke electro-hydraulic servo system.

Specifically, a specific process of the electro-hydraulic servo system generating the respective output force based on the driving signal and pushing the load to move is as follows:

(1) the servo valve generates a spool movement based on the driving signal, and changes a servo valve opening size, thereby affecting the amounts of a hydraulic oil flowing into and out of the left and right chambers of the hydraulic cylinder.

(2) the hydraulic oil flowing into and out of the hydraulic cylinder changes the hydraulic pressures in the two chambers. The difference between the hydraulic pressures of the left and right chambers produces a pressure difference, which acts on the piston to generate a pressure to push the piston to move. The leakage and compression of the hydraulic oil will affect the movement of the piston.

(3) the piston pushes the load to move, and at the same time outputs a force outwardly to do work. The load movement will also affect the piston.

In step S204, a plurality of motion signals of pistons of the actuator relative to the respective hydraulic cylinders are detected, and depending on a feedback strategy that is adopted, the plurality of motion signals is input as feedback signals to the controllers of the two electro-hydraulic servo systems, to further correct the driving signals of the electro-hydraulic servo systems.

It is understandable that the embodiments of the present disclosure use sensors to detect the movements of the pistons of the two cylinders in real time, measure the displacement, velocity, acceleration and other parameters of the pistons of the two hydraulic cylinders relative to their respective hydraulic cylinders, and input these motion signals as feedback signals to the controllers of the two electro-hydraulic servo systems, to further correct the driving signals $I_1$ and $I_2$ of the electro-hydraulic servo systems.

Further, in an embodiment of the present disclosure, the feedback strategy is: a feedback strategy 1 of inputting the motion signal of the piston of the long hydraulic cylinder to the short-stroke and high-frequency controller, the feedback signal of the short-stroke and high-frequency controller being an absolute motion signal of the force applying end head; or a feedback strategy 2 of inputting the motion signals of respective pistons to respective controllers, and using the relative motion signals of the pistons as the feedback signals of the respective controllers.

It is understandable that when the feedback strategy 2 is adopted, it is only necessary to input the motion signals of the pistons relative to the cylinders to the corresponding controllers and use the relative motion signals of the two pistons as the feedback signals of the controllers; when the feedback strategy 1 is adopted, it is further necessary to input the motion signal of the piston of the long hydraulic cylinder to the short-stroke and high-frequency controller, and in this case, the feedback signal of the short-stroke and high-frequency controller is an absolute motion signal of the force applying end head, i.e., the sum of the relative motion signals of the two pistons.

Figure 6:
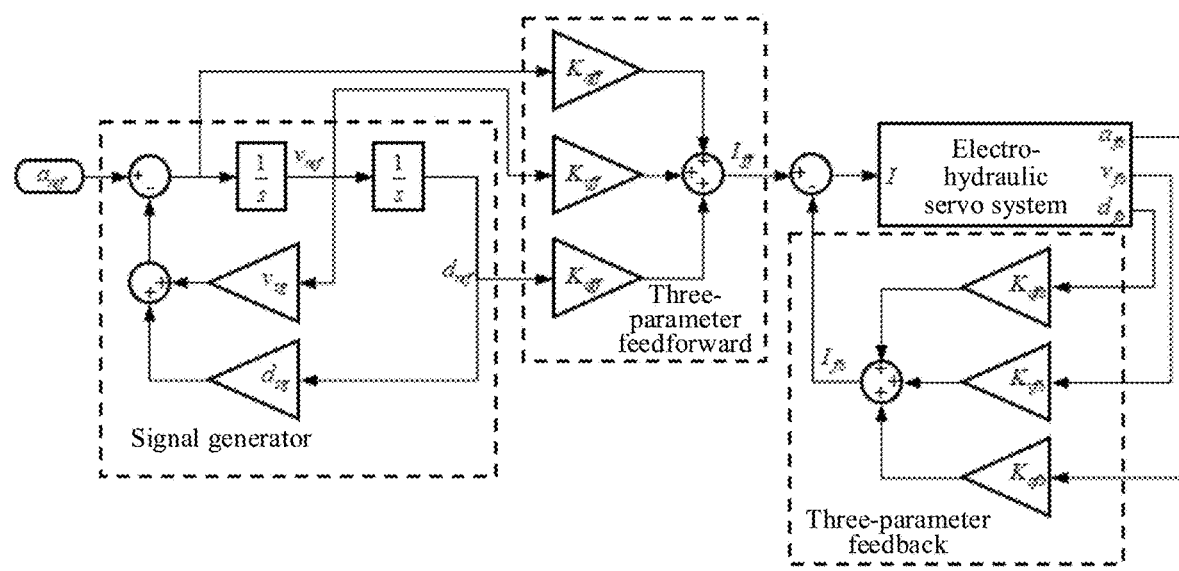
FIG. 6 is a structural schematic diagram of a three-parameter controller according to an embodiment of the present disclosure.

Further, the specific process of the three-parameter controllers according to the above embodiment calculating and correcting the driving signals of the electro-hydraulic servo systems based on the reference signals and the feedback signals is shown in FIG. 6, and the steps thereof are as follows:

(1) In a signal generator part, a reference acceleration signal $a_{ref}$ is integrated twice to obtain a reference velocity signal $v_{ref}$ and a reference displacement signal $d_{ref}$.

(2) In a three-parameter feedforward part, the three reference signals are added together based on certain coefficients, to obtain a feedforward driving signal $I_{ff}$ based on the formula $I_{ff}=K_{aff}a_{ref}+K_{vff}v_{ref}+K_{dff}d_{ref}$, where $K_{aff}, K_{vff}$ and $K_{dff}$ are feedforward coefficients.

(3) In a three-parameter feedback part, the three feedback signals are added together based on certain coefficients, to obtain the feedback driving signal $I_{fb}$ based on the formula $I_{fb}=K_{afb}a_{fb}+K_{vfb}v_{fb}+K_{dfb}d_{fb}$, where $K_{afb}, K_{vfb}$ and $K_{dfb}$ are feedback coefficients.

(4) Combining the feedforward and feedback results, the driving signals of the electro-hydraulic servo systems are calculated based on the formula $I=I_{ff}-I_{fb}$.

In summary, in order to achieve long-stroke and high-frequency loading, the embodiments of the present disclosure propose an actuator control process based on a high and low-frequency separation method and a dual-chamber, dual-piston, dual-characteristic coupling control algorithm to achieve the coordinated work of the dual electro-hydraulic servo systems and the precise output of the target excitation. The control process and algorithm are advanced, and have high robustness. Specifically: (1) the advanced high and low-frequency separation method is adopted to achieve the separation and application of the signal, that is, the frequency division algorithm is adopted to achieve separation and application of high frequency excitation and low frequency excitation; (2) the advanced control algorithms such as three-parameter control algorithm, PID control algorithm, iterative control algorithm, adaptive control algorithm, robust control algorithm, optimal control algorithm, and acceleration trajectory tracking control algorithm, etc. are adopted to achieve precise and stable output of the target excitation of the actuator. By adopting this actuator and the control method, the high-frequency and large-displacement target excitation of 0.1 to 200 Hz and 0 to 1500 mm can be outputted, which has high advancement and application value, breaks through the technical bottlenecks of the traditional actuators and shaking tables that cannot achieve the long-stroke and high-frequency loading and is conducive to the development of earthquake simulation shaking table tests of large and complex structures.

It should be noted that the above explanation of the embodiments of the electro-hydraulic servo actuator capable of implementing long-stroke and high-frequency loading is also applicable to the control method of the electro-hydraulic servo actuator capable of implementing long-stroke and high-frequency loading of the embodiments, which will not be repeated here.

The control method of the electro-hydraulic servo actuator capable of implementing long-stroke and high-frequency loading according to the embodiments of the present disclosure breaks through the technical limitations of traditional actuators that cannot apply an excitation with both a large displacement and a high frequency, and can realize low-power, high-efficiency, and accurate large-displacement and high-frequency target excitation generation and loading; the electro-hydraulic servo actuator has a simple structure, clear force transmission, and each part has reasonable force bearing status; the control process and algorithm that the actuator adopts are advanced and have high robustness to ensure that the target excitation can be output accurately and stably; the product has good practicability and high integration, and can be customized and produced based on application needs; further, the research and development and promotion of the actuator will greatly promote the development of earthquake simulation shaking table tests for large and complex structures, and provide a solid guarantee for the safe and reasonable design of such structures.

In addition, the following contents also fall within the proception scope of the present disclosure: other actuator forms or construction methods which are not disclosed here, but belong to the combination form of "the key components such as the fixed end head, the fixed hinge joint, the fixed-end rod, the low frequency electro-hydraulic servo valve, the long hydraulic cylinder, the rod chamber, the rigid joint, the high frequency electro-hydraulic servo valve, the short hydraulic cylinder, the force applying end rod, and the force applying end head, as well as supporting facilities such as the oil pipe, the transmission cable, and the control terminal"; methods of using other frequency division algorithms to achieve separate application of high frequency excitation and low frequency excitation; and output control of the actuator achieved by other control algorithms.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "plurality" means at least two, such as two, three, etc., unless otherwise specifically defined.

In the description of this specification, descriptions with reference to the terms "an embodiment", "some embodiments", "examples", "specific examples", or "some examples" etc. mean that specific features, structures, materials or characteristics described in conjunction with the embodiment or example are included in at least one embodiment or example of the present disclosure. In this specification, the schematic representations of the above terms do not necessarily refer to the same embodiment or example. In addition, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although the embodiments of the present disclosure have been illustrated and described above, it can be understood that the above-mentioned embodiments are exemplary and should not be construed as limiting the present disclosure. Those of ordinary skill in the art can make changes, modifications, substitutions and variations to the above-mentioned embodiments within the scope of the present disclosure.

What is claimed is:

1. An electro-hydraulic servo actuator capable of implementing long-stroke and high-frequency loading, comprising:
   a long hydraulic cylinder with a piston;
   a short hydraulic cylinder with a piston;
   a fixed-end rod having one end connected to the piston of the long hydraulic cylinder, and the other end fixed;
   a low frequency electro-hydraulic servo valve and a high frequency electro-hydraulic servo valve, the low frequency electro-hydraulic servo valve and the high frequency electro-hydraulic servo valve being configured to convert electrical signals into hydraulic pressure flow control signals to control hydraulic pressure changes in left and right chambers of the hydraulic cylinders to implement corresponding piston movements;
   a left rod chamber and a right rod chamber; and
   a force applying end head and a force applying end rod, wherein the force applying end rod is connected to the piston of the short hydraulic cylinder and the force applying end head to output a movement of the piston of the short hydraulic cylinder to the force applying end head, the force applying end head has one end connected to the force applying end rod through a hinge joint, and the other end connected to a specimen under a load test, thereby applying a target large-displacement and high-frequency excitation to the specimen under the load test,
   wherein a piston displacement of the short hydraulic cylinder comprises a small-displacement and high-frequency movement of the piston of the short hydraulic cylinder relative to the short hydraulic cylinder under hydraulic pressure changes controlled by the high frequency electro-hydraulic servo valve, and a large-displacement and low-frequency movement generated by the short hydraulic cylinder itself along with the long hydraulic cylinder,
   wherein the piston displacement of the short hydraulic cylinder is a large-displacement and high-frequency movement generated by a combination of the small-displacement and high-frequency movement and the large-displacement and low-frequency movement.

2. The electro-hydraulic servo actuator according to claim 1, further comprising:
   a fixed hinge joint and a fixed end head, the fixed hinge joint and the fixed end head being configured to fix the other end of the fixed-end rod to a ground or a reaction wall.

3. The electro-hydraulic servo actuator according to claim 1, wherein the left rod chamber and the right rod chamber are connected to each other through a rigid joint, wherein the rigid joint is an end plate bolt connection between the left rod chamber and the right rod chamber or a welding connection between the left rod chamber and the right rod chamber, in such a manner that the left rod chamber and the right rod chamber have no relative displacement in six degrees of freedom.

4. A control method of an electro-hydraulic servo actuator capable of implementing long-stroke and high frequency loading, wherein the electro-hydraulic servo actuator comprises:
   a long hydraulic cylinder with a piston;
   a short hydraulic cylinder with a piston;
   a fixed-end rod having one end connected to the piston of the long hydraulic cylinder, and the other end fixed;
   a low frequency electro-hydraulic servo valve and a high frequency electro-hydraulic servo valve, the low frequency electro-hydraulic servo valve and the high frequency electro-hydraulic servo valve being configured to convert electrical signals into hydraulic pressure flow control signals to control hydraulic pressure changes in left and right chambers of the hydraulic cylinders to implement corresponding piston movements;
   a left rod chamber and a right rod chamber; and
   a force applying end head and a force applying end rod, wherein the force applying end rod is connected to the piston of the short hydraulic cylinder and the force applying end head to output a movement of the piston of the short hydraulic cylinder to the force applying end head, the force applying end head has one end connected to the force applying end rod through a hinge joint, and the other end connected to a specimen under a load test, thereby applying a target large-displacement and high-frequency excitation to the specimen under the load test, the control method comprising:

obtaining a target acceleration signal, and obtaining a low-frequency acceleration signal and a high-frequency acceleration signal based on the target acceleration signal through a frequency division algorithm;

inputting reference signals to a long-stroke and low-frequency controller and a short-stroke and high-frequency controller, respectively, depending on a control strategy and a control algorithm that are adopted;

controlling the long-stroke and low-frequency controller to output a first driving signal to a long-stroke electro-hydraulic servo system, and controlling the short-stroke and high-frequency controller to output a second driving signal to a short-stroke electro-hydraulic servo system, in such a manner that the long-stroke electro-hydraulic servo system and the short-stroke electro-hydraulic servo system generate respective output forces based on respective driving signals and push a load to move, wherein the long-stroke electro-hydraulic servo system comprises the long hydraulic cylinder with the piston and the low frequency electro-hydraulic servo valve, and the short-stroke electro-hydraulic servo system comprises the short hydraulic cylinder with the piston and the high frequency electro-hydraulic servo valve; and detecting a plurality of motion signals of pistons of the electro-hydraulic servo actuator relative to respective hydraulic cylinders of the electro-hydraulic servo actuator, and inputting, depending on a feedback strategy that is adopted, the motion signals as feedback signals to the controllers of the two electro-hydraulic servo systems, to further correct the driving signals of the electro-hydraulic servo systems.

5. The method according to claim 4, wherein the frequency division algorithm comprises:

transforming the target acceleration signal a from a time domain to a frequency domain through fast Fourier transform;

cutting the obtained frequency domain signal into two sections at a predetermined frequency to obtain a high-frequency frequency domain signal and a low-frequency frequency domain signal;

transforming the obtained two frequency domain signals back to the time domain through inverse fast Fourier transform to obtain a low-frequency time domain signal $a_1$ and a high-frequency time domain signal $a_2$; and adding the two time domain signals $a_1$ and $a_2$ together to obtain the original target acceleration signal a to verify a correctness of signal separation.

6. The method according to claim 4, wherein the control algorithm is a three-parameter control algorithm, a PID control algorithm, an iterative control algorithm, an adaptive control algorithm, a robust control algorithm, an optimal control algorithm, or an acceleration trajectory tracking control algorithm.

7. The method according to claim 4, wherein the control strategy is:

a control strategy of tracking, by the piston of the long hydraulic cylinder, the low-frequency acceleration signal, and simultaneously tracking, by the piston of the short hydraulic cylinder, the target acceleration signal, wherein a reference signal for the long-stroke and low-frequency controller is the low-frequency acceleration signal, and a reference signal for the short-stroke and high-frequency controller is the target acceleration signal; or a control strategy of tracking, by the piston of the long hydraulic cylinder, the low-frequency acceleration signal, and simultaneously tracking, by the piston of the short hydraulic cylinder, the high-frequency acceleration signal relative to the piston of the long hydraulic cylinder, wherein the reference signal for the long-stroke and low-frequency controller is the low-frequency acceleration signal, and the reference signal for the short-stroke and high-frequency controller is the high-frequency acceleration signal.

8. The method according to claim 7, wherein the feedback strategy is:

a feedback strategy of inputting a motion signal of the piston of the long hydraulic cylinder to the short-stroke and high-frequency controller, a feedback signal of the short-stroke and high-frequency controller being an absolute motion signal of the force applying end head, that is, a sum of relative motion signals of the two pistons; or a feedback strategy of inputting motion signals of respective pistons to respective controllers, and using the relative motion signals of the pistons as feedback signals of the respective controllers.

9. The method according to claim 4, wherein an output force generated by the long-stroke electro-hydraulic servo system pushes the piston of the long hydraulic cylinder, the piston of the short hydraulic cylinder, and the force applying end head to move, an output force generated by the short-stroke electro-hydraulic servo system pushes the forcing applying end head to move, and at the same time, a reaction force is generated and applied to the long-stroke electro-hydraulic servo system.

10. The method according to claim 4, wherein the electro-hydraulic servo actuator further comprises:

a fixed hinge joint and a fixed end head, the fixed hinge joint and the fixed end head being configured to fix the other end of the fixed-end rod to a ground or a reaction wall.

11. The method according to claim 4, wherein the left rod chamber and the right rod chamber are connected to each other through a rigid joint, wherein the rigid joint is an end plate bolt connection between the left rod chamber and the right rod chamber or a welding connection between the left rod chamber and the right rod chamber, in such a manner that the left rod chamber and the right rod chamber have no relative displacement in six degrees of freedom.

12. The method according to claim 4, wherein a piston displacement of the short hydraulic cylinder comprises a small-displacement and high-frequency movement of the piston of the short hydraulic cylinder relative to the short hydraulic cylinder under hydraulic pressure changes controlled by the high frequency electro-hydraulic servo valve, and a large-displacement and low-frequency movement generated by the short hydraulic cylinder itself along with the long hydraulic cylinder.

\* \* \* \* \*